Jan. 16, 1934.  F. J. BIANE ET AL  1,943,753
APPARATUS FOR CARBONATING LIQUIDS IN RECEPTACLES
Filed July 31, 1933   2 Sheets-Sheet 1

Inventors
Frank J. Biane
Samuel B. Rowe
By
Attorney

Jan. 16, 1934.  F. J. BIANE ET AL  1,943,753
APPARATUS FOR CARBONATING LIQUIDS IN RECEPTACLES
Filed July 31, 1933  2 Sheets-Sheet 2
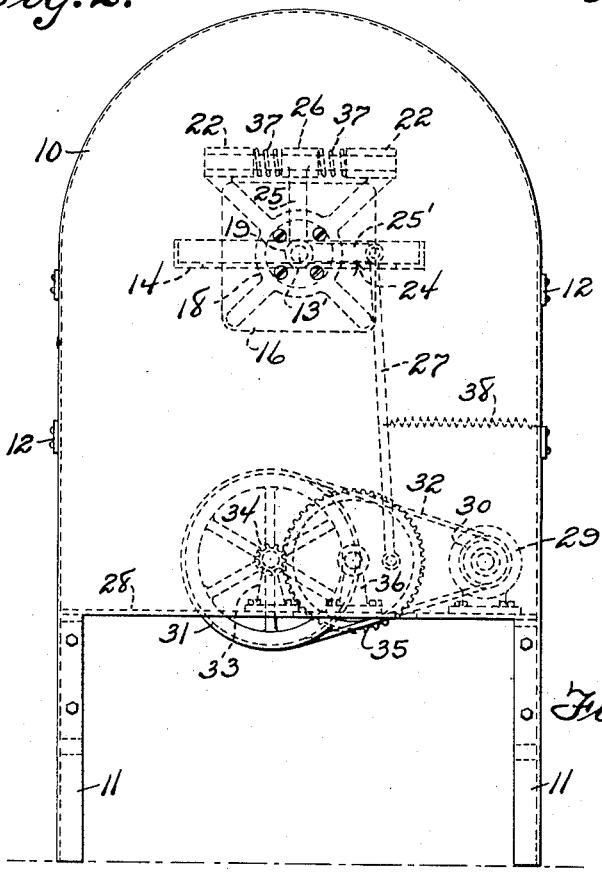
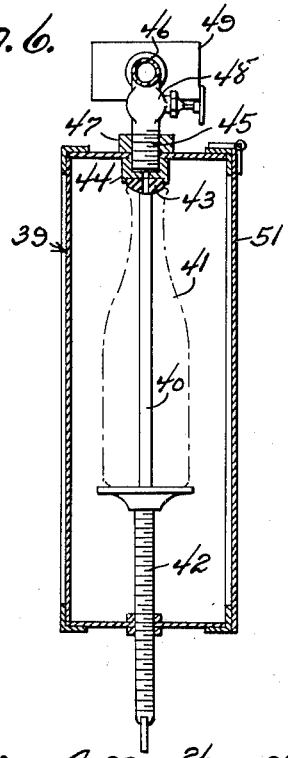
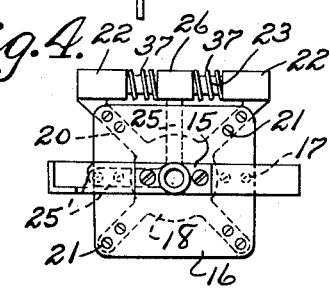
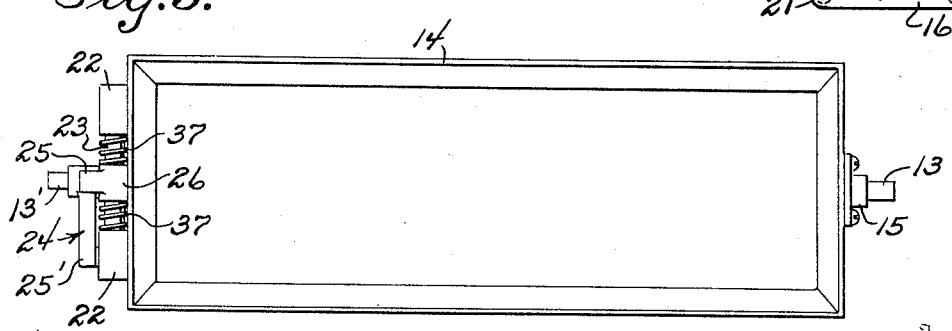
Inventors
Frank J. Biane
Samuel B. Rowe
By
Attorney Patented Jan. 16, 1934

1,943,753

UNITED STATES PATENT OFFICE 1,943,753

APPARATUS FOR CARBONATING LIQUIDS IN RECEPTACLES

Frank J. Biane, Cucamonga, and Samuel B. Rowe, Upland, Calif.

Application July 31, 1933. Serial No. 683,064

9 Claims. (Cl. 226—20)

The present invention relates to apparatus for carbonating liquids in receptacles, and comprehends a novel construction and arrangement of parts whereby the receptacles are very effectively agitated while the carbon dioxide gas is being supplied to the contents of the receptacles.

In carrying out the invention we contemplate the use of a basket in which the receptacles are arranged while carbonating the contents thereof, together with a novel construction of means for rocking the basket against cushioning elements which provide for an effective agitation of the contents of the receptacle while being supplied with the carbon dioxide gas.

An important object of the invention resides in the provision of means whereby the basket above referred to can be quickly and conveniently associated with or removed from the apparatus as the occasion might require, thus permitting the substitution of one basket of receptacles for another with a minimum loss of both time and effort.

The nature and advantages of the invention will be better understood when the following detail description is read in connection with the accompanying drawings, the invention residing in the combination, construction and arrangement of parts as claimed.

In the drawings forming part of this application like numerals of reference indicate similar parts in the several views and wherein:

Figure 2 is an end elevation thereof.

Figure 3 is a top plan view of the basket supporting frame.

Figure 4 is an end elevation thereof partly in section.

Figure 6 is a section taken on line 6—6 of Figure 5 showing how each receptacle is supported within the basket.

Figure 1:
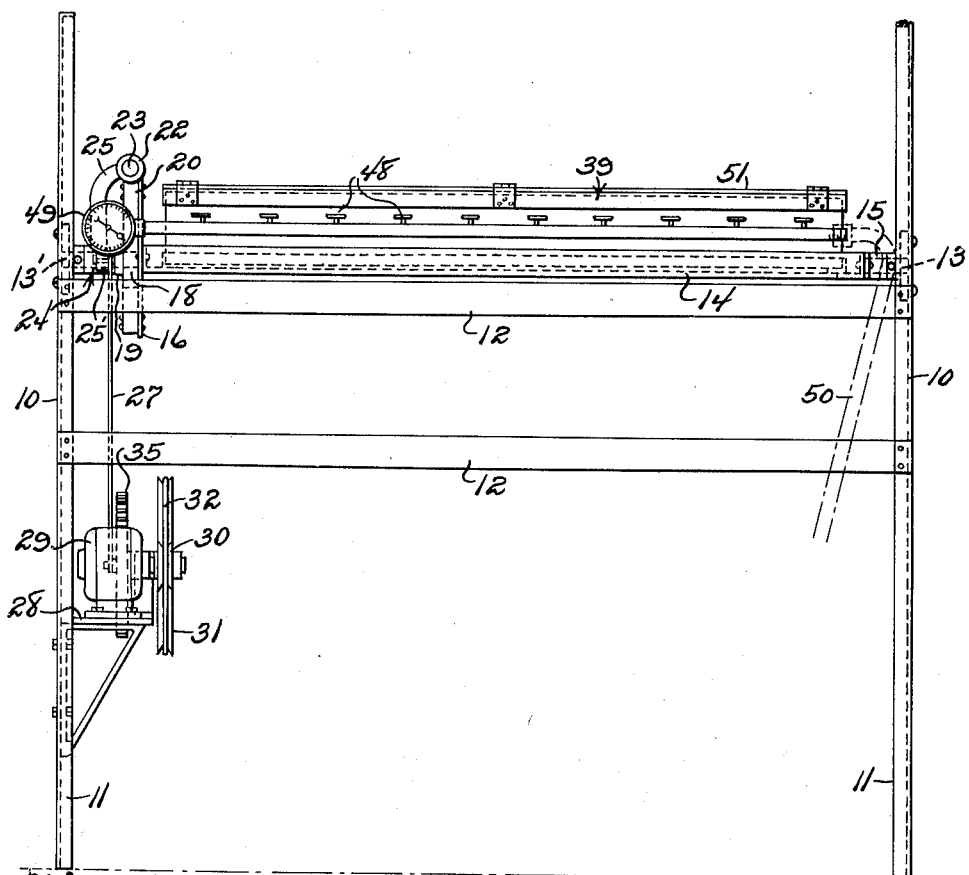
Figure 1 is a side elevation of the apparatus.

The apparatus forming the subject matter of the instant invention may of course vary in size and design, and may be constructed from any suitable material without departing from the spirit of the invention.

Essentially the apparatus embodies a supporting structure, which in the specific embodiment herein illustrated includes opposed end walls 10 supported by legs 11, while the end walls are connected by spaced longitudinal strips 12. Projecting inwardly from the end walls 10 of the supporting structure are stationary stub shafts 13 and 13' on which the basket supporting frame 14 is mounted for rocking movement. The frame 14 is preferably constructed of angle bars and of elongated contour. At one end the frame is provided with a bearing 15 for the adjacent stub shaft 13 while secured to the opposite end of the frame is part of the mechanism for imparting a rocking agitating motion thereto.

This mechanism includes a bracket plate 16 secured to the adjacent end of the basket supporting frame in any suitable manner as at 17. Carried by one side of the plate 16 is a spider, the body portion 18 of which is provided with a bearing 19 for the adjacent stub shaft 13'. The arms 20 of the spider extend in the direction of the corners of the plate 16 and are riveted or otherwise secured to the latter as at 21. As clearly illustrated in Figures 2 and 4 of the drawings, the upper pair of spider arms 20 project beyond the bracket plate 16 and support a pair of opposed hollow tubular members 22. Frictionally fitted in these tubular members are the ends of a rod 23.

Journaled on the stub shaft 13' is the hub 24 of a bell crank lever, the hub 24 being arranged in end to end relation with the hub of the spider as clearly illustrated. One branch 25 of the bell crank lever extends upwardly and is curved in the direction of the rod 23, and terminally supports a sleeve 26 slidably mounted on the rod 23. The other branch 25' of the bell crank lever is terminally connected with the adjacent end of a pitman 27 through the instrumentality of which the basket supporting frame 15 is rocked in a manner to be presently described.

Carried by one end wall 10 of the supporting structure is a shelf 28 on which is mounted an electric motor 29. A small pulley 30 is carried by the motor shaft, while trained over this pulley and a larger pulley 31 is an endless belt 32. The axle of the large pulley is journaled in a suitable bearing 33 and carries a small pinion 34 which meshes with a larger pinion 35 journaled as at 36. The lower end of the pitman 27 is operatively connected with the larger pinion 35 so that incident to the rotation of the latter, the basket supporting frame 14 will be rocked upon the stub shafts 13 and 13'.

Encircling the rod 23 and interposed between the opposite ends of the sleeve 26 and the adjacent ends of the tubular members 22 are cushioning elements 37. While these elements may vary in form, they are preferably in the nature of coil springs. By virtue of this construction, it is obvious that incident to the operation of the bell crank lever, the sleeve 26 thereof alternately compresses the cushioning elements 37, through the instrumentality of which, the basket supporting frame 24 is not only rocked, but also given an agitating movement resulting in a quicker and more effective carbonization of the liquid being dealt with. Also connected with the pitman 27 is a return spring 38.

Figure 5:
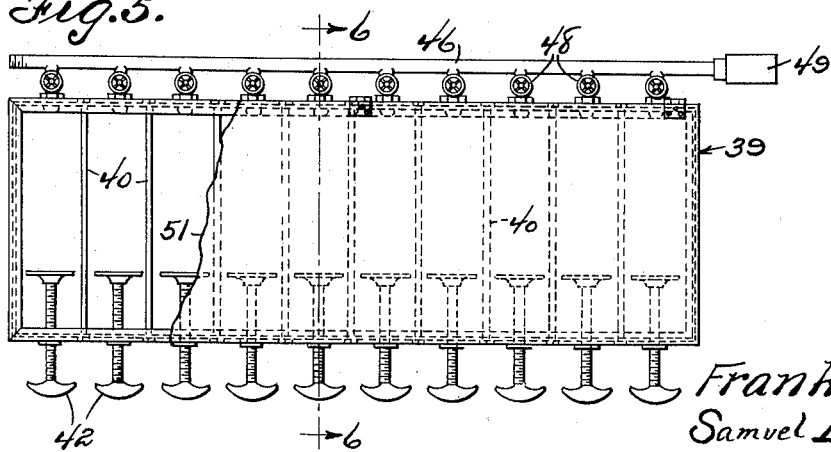
Figure 5 is a plan view of the removable basket and its associated parts.

The liquid to be carbonated is contained in suitable receptacles, preferably bottles which are arranged in a basket 39. The basket is preferably divided by partitions 40 into separate compartments for the bottles 41 as illustrated in Figure 5. Threadedly adjustable through one end of each compartment is a follower 42 adapted to engage the bottom of the adjacent bottle and move the mouth of the latter into effective engagement with a gasket 43 supported at the other end of the compartment. The gasket 43 is seated in the recess of a nut 44 disposed within the compartment and threaded on a nipple 45 projecting from the inlet manifold 46 for the carbon dioxide gas. Manifestly there is one of these nipples 45 for each compartment of the basket, while each nipple is held associated with the basket by a nut 47 located exteriorly of the basket. Each nipple is also provided with a valve 48 whereby the amount of carbon dioxide gas admitted to each bottle can be regulated. One end of the intake manifold 46 is provided with a pressure gauge 49 while the opposite end is adapted to be coupled with a flexible hose 50 leading from the tank or source of carbon dioxide gas supply. Of course the supply of gas can be admitted to the manifold 46 either at the end or at the middle thereof. The basket is also provided with a suitable cover 51.

In practice, the basket is filled with bottles containing liquid to be carbonated, and the basket including the inlet manifold is then seated in its supporting frame 14. The bottles are adjusted to the nipples 45 of the intake manifold and the supply hose 50 coupled to the latter. The motor 29 is started and the basket and its supporting frame is rocked with an agitating movement to effectively carbonate the contents of the bottle. The amount of carbon dioxide gas admitted to each bottle under a predetermined pressure and for a predetermined period of time is controlled by the individual valves 48. When the operation is completed, it is only necessary to disconnect the hose 50 from the intake manifold, whereupon the basket containing the bottles can be conveniently lifted from the frame 14, thereby permitting another basket of bottles containing liquid to be carbonated to be associated with the apparatus with the minimum of time and effort.

While it is believed that from the foregoing description the nature and advantages of the invention will be readily apparent we desire to have it known that we do not limit ourselves to what is herein illustrated or described and that such changes may be resorted to when desired as fall within the scope of what is claimed.

What is claimed is:

1. In an apparatus of the character described, a supporting structure, a basket supporting frame mounted for rocking movement thereon, a basket removably fitted in said frame and divided into parallel compartments, means for clamping liquid containing receptacles in said compartments, a gas intake manifold supported by the basket and having individual valve controlled communication with each receptacle, and means for rocking and agitating said basket.

2. In an apparatus of the character described, a supporting structure, a basket supporting frame mounted for rocking movement thereon, a basket removably fitted in said frame, means for removably clamping a plurality of liquid containing receptacles in said basket, a gas intake manifold supported by the basket and having individual valve controlled communication with said receptacles, means for rocking and agitating said basket, said means including a motor operated bell crank lever connected with said frame.

3. In an apparatus of the character described, a supporting structure, a basket supporting frame mounted for rocking movement thereon, a basket removably fitted in said frame, and divided into parallel compartments, a gas intake manifold supported by the basket and including nipples projecting therefrom into the respective compartments of the basket, means for removably clamping a plurality of liquid containing receptacles in said compartments with the mouth of each receptacle engaging the adjacent nipple, means for rocking and agitating said basket and frame, said means including a motor operated bell crank lever connected with the frame.

4. In an apparatus of the character described, a supporting structure, a basket supporting frame mounted for rocking movement thereon, a basket removably fitted in said frame, a gas intake manifold supported by the basket and including discharge nipples projecting within the basket, means for clamping a plurality of liquid containing receptacles in said basket with the mouth of each receptacle engaging the adjacent nipple, means for rocking and agitating said basket, said means including a motor operated bell crank lever connected with the frame, reducing gears, and a pitman connecting said lever with one of said gears.

5. In an apparatus of the character described, a supporting structure, a basket supporting frame mounted for rocking movement thereon, a basket removably fitted in said frame, means for removably clamping a plurality of liquid containing receptacles in said basket, a gas intake manifold supported by the basket and having individual valve controlled communication with said receptacles, means for rocking and agitating said basket supporting frame, said means including a pivoted bell crank lever connected with said frame, and cushioning elements included in said connection and located at opposite sides of the lever.

6. In an apparatus of the character described, a supporting structure, a basket supporting frame mounted for rocking movement thereon, a basket removably fitted in the frame, means for removably clamping a plurality of liquid containing receptacles in the basket, a gas intake manifold supported by the basket and having individual valve controlled communication with said receptacles, a bracket plate secured to said basket supporting frame, a rod associated with said plate, means for rocking and agitating said frame, said means including a motor operated bell crank lever slidable on said rod, and cushioning elements supported by said rod and engaging the opposite sides of said lever.

7. In an apparatus of the character described, a supporting structure, a basket supporting frame mounted for rocking movement thereon, a basket removably fitted in said frame, means for removably clamping a plurality of liquid containing receptacles in said basket, a gas intake manifold supported by the basket and having individual valve controlled communication with said receptacles, a bracket plate secured to the basket supporting frame, a rod associated with said plate, means for rocking and agitating said frame, said means including a pivoted bell crank lever, a sleeve carried by one branch of the lever and slidable on said rod, cushioning elements supported by the rod and engaging the opposite ends of the sleeve, reducing gears, and a pitman connecting the other branch of the lever with one of said gears.

8. In an apparatus of the character described, a supporting structure, stub shafts projecting therefrom, a basket supporting frame, a bearing on one end of the frame journaled on the adjacent stub shaft, a bracket plate secured to the opposite end of the frame, a spider carried by said plate and including a hub journaled on the other of said stub shafts, a basket removably fitted in the frame, means for removably clamping a plurality of liquid containing receptacles in said basket, a gas intake manifold supported by the basket and having individual valve controlled communication with said receptacles, means for rocking and agitating said frame, said means including a bell crank lever journaled on one of the stub shafts, and connected with said spider, and cushioning elements for said lever included in the connection and arranged at opposite sides of the lever.

9. In an apparatus of the character described, a supporting structure, stub shafts projecting therefrom, a basket supporting frame mounted for rocking movement, a bearing on one end of the frame journaled on the adjacent stub shaft, a bracket plate secured to the opposite end of the frame, a spider carried by said plate and including a hub journaled on the other of said stub shafts, said spider including a pair of divergent arms terminating above the plate, opposed hollow tubular members terminally supported by said arms, a rod having its ends fitted in said tubular members, means for removably clamping a plurality of liquid containing receptacles in said basket, a gas intake manifold supported by the basket and having individual valve controlled communication with said receptacles, means for rocking and agitating said frame, said means including a motor operated bell crank lever pivoted on one of said stub shafts, a sleeve carried by one branch of the lever and slidable on said rod, and cushioning elements supported by the rod and engaging the opposite ends of said sleeve.

FRANK J. BIANE.
SAMUEL B. ROWE.